(12) United States Patent
Sugahara (10) Patent No.: US 7,744,796 B2
(45) Date of Patent: Jun. 29, 2010

(54) METHODS OF FORMING IMPRINT ON RESIN-MOLDED PRODUCT, AND RESIN-MOLDED PRODUCT

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 29 days.

(21) Appl. No.: 12/196,735

(22) Filed: Aug. 22, 2008

(65) Prior Publication Data

US 2009/0051075 A1    Feb. 26, 2009

(30) Foreign Application Priority Data

Aug. 22, 2007    (JP)    ............... 2007-216083

(51) Int. Cl.
    *B29B 33/40*    (2006.01)
(52) U.S. Cl. ............... 264/220; 264/219; 264/247; 249/102; 249/103; 249/104
(58) Field of Classification Search ............... 264/220, 264/247; 249/102, 103, 104
    See application file for complete search history.

(56) References Cited

U.S. PATENT DOCUMENTS

2003/0205623 A1 *    11/2003    Huang et al. ............... 235/494

FOREIGN PATENT DOCUMENTS

| JP | 2000001036 A | 1/2000 |
|---|---|---|
| JP | 2004174873 A | 6/2004 |

* cited by examiner

*Primary Examiner*—Philip C Tucker
*Assistant Examiner*—Amjad Abraham
(74) *Attorney, Agent, or Firm*—Baker Botts L.L.P.

(57) ABSTRACT

A method of forming an identifying imprint on a resin-molded product, includes the step of dividing a material into a first portion and a second portion, to form an identifying surface on at least one of the first portion and the second portion. The method also includes the steps of molding a resin material into the resin-molded product, and transferring an imprint of the identifying surface onto the resin-molded product.

16 Claims, 11 Drawing Sheets

METHODS OF FORMING IMPRINT ON RESIN-MOLDED PRODUCT, AND RESIN-MOLDED PRODUCT

CROSS-REFERENCE TO RELATED APPLICATION

The present application claims priority from Japanese Patent Application No. JP-2007-216083, which was filed on Aug. 22, 2007, the disclosure of which is incorporated herein by reference in its entirety.

BACKGROUND OF THE INVENTION

1. Field of the Invention

The invention relates generally to methods of forming an imprint on a resin-molded product, and a resin-molded product.

2. Description of Related Art

A known ink cartridge for use with an inkjet printer is a resin-molded product. Inkjet-printer manufactures provide genuine ink cartridges, but counterfeit or compatible ink cartridges also are commercially distributed. The counterfeit or compatible cartridges may have substantially the same appearances as or similar appearances to the genuine cartridges. Inkjet printers offer enough performance expected by the inkjet-printer manufactures when used with genuine ink cartridges. Nevertheless, inkjet printers may offer lower performance when used with counterfeit or compatible ink cartridges.

Another known ink cartridge may have a mark to indicate that the ink cartridge is genuine. Nevertheless, such a mark may be copied, and the copied mark may be put on a counterfeit or compatible ink cartridge. To prevent the mark from being copied, yet another known ink cartridge may have a hologram sticker or reflector as the mark. Such a known ink cartridge is described in JP-A-2000-1036 and JP-A-2004-174873, for example. By detecting light reflected by the hologram sticker or reflector, it is determined whether the ink cartridge is genuine. It may be relatively difficult to reproduce the hologram sticker or reflector with a color copier or other means.

Nevertheless, the manufacturing cost of the hologram sticker and the reflector is relatively high. Moreover, if the manufacturers of counterfeit or compatible ink cartridges obtain a high skill, they may be able to analyze and copy the hologram sticker or reflector. In such a case, a counterfeit or compatible ink cartridge may be determined as genuine.

SUMMARY OF THE INVENTION

Therefore, a need has arisen for methods forming a mark, e.g., an imprint, on a resin-molded product, and a resin-molded product which overcome these and other shortcomings of the related art. A technical advantage of the invention is that a mark, e.g., an imprint, which is difficult to copy, is formed in a simple way.

In an embodiment of the invention, a method of forming an identifying imprint on a resin-molded product, comprises the steps of dividing a particular material into a first portion of the particular material and a second portion of the particular material to form an identifying surface on at least one of the first portion and the second portion of the particular material, molding a resin material into the resin-molded product, and transferring an imprint of the identifying surface of the particular material onto the resin-molded product.

In another embodiment of the invention, a method of forming an identifying imprint on a resin-molded product, comprises the steps of forming a recessed portion in an end surface of a first portion of a particular material, joining the end surface of the first portion of the particular material to an end surface of a second portion of the particular material, dividing the joined particular material, at a predetermined position adjacent to the recessed portion of the first portion, into a modified first portion of the particular material and a modified second portion of the particular material, to form an identifying surface on at least one of the modified first portion and the modified second portion of the particular material, molding a resin material into the resin-molded product, and transferring an imprint of the identifying surface of at least one of the modified first portion and the modified second portion of the particular material onto the resin-molded product.

In still another embodiment of the invention, a method of manufacturing a resin-molded product comprises the steps of dividing a particular material into a first portion of the particular material and a second portion of the particular material to form an identifying surface on at least one of the first portion and the second portion of the particular material, molding a resin material into the resin-molded product, and marking the resin molded-product by transferring an imprint of the identifying surface of the particular material onto the resin-molded product.

In yet a further embodiment of the invention, a resin molded product manufactured by a method comprises the steps of dividing a particular material into a first portion of the particular material and a second portion of the particular material to form an identifying surface on at least one of the first portion and the second portion of the particular material, molding a resin material into the resin-molded product, and transferring an imprint of the identifying surface of the particular material onto the resin-molded product.

In still yet a further embodiment of the invention, a method of forming an identifying imprint on a resin-molded product, comprises the steps of applying a force to an extending portion of an inner surface of a die, dividing the extending portion from the inner surface of the die via the applied force to form an identifying surface on at least a portion of the inner surface of the die, molding a resin material into the resin-molded product with the inner surface of the die, and transferring an imprint of the identifying surface of the inner surface of the die onto the resin-molded product.

Other objects, features, and advantages of embodiments of the invention will be apparent to persons of ordinary skill in the art from the following description of preferred embodiments with reference to the accompanying drawings.

BRIEF DESCRIPTION OF DRAWINGS

For a more complete understanding of the invention, the needs satisfied thereby, and the objects, features, and advantages thereof, reference now is made to the following description taken in connection with the accompanying drawings.

DETAILED DESCRIPTION OF THE EMBODIMENTS

Embodiments of the invention and their features and technical advantages may be understood by referring to FIGS. 1-11(c), like numerals being used for like corresponding portions in the various drawings.

Figure 1:
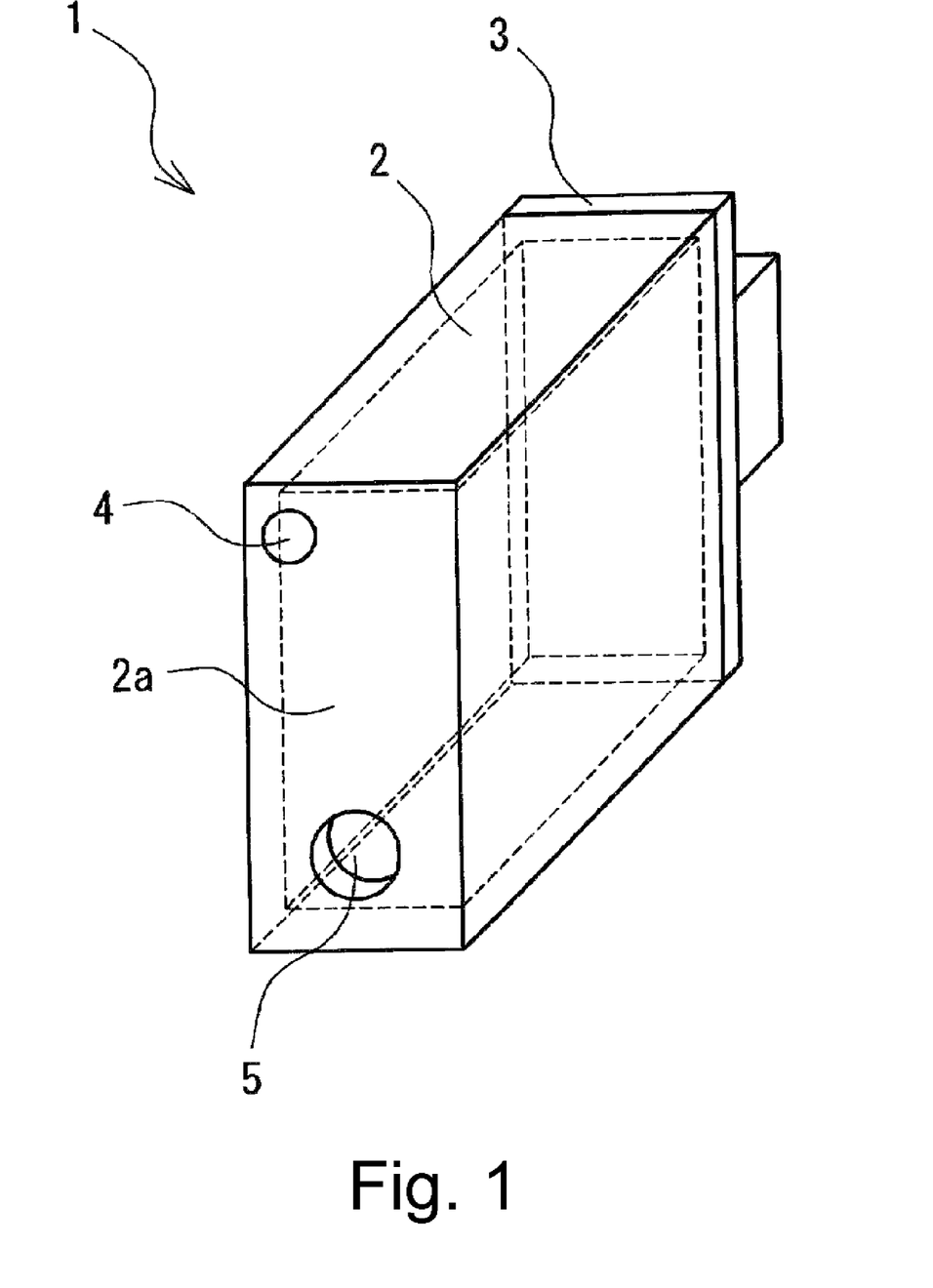
FIG. 1 is a perspective view of an ink cartridge according to an embodiment of the invention.

Referring to FIG. 1, an ink cartridge 1, may be a resin-molded product, which may be used with an inkjet printer (not shown) according to an embodiment of the invention. Ink cartridge 1 may be configured to be removably mounted to the inkjet printer, which also may be configured to eject ink towards a sheet of paper, to record an image on the sheet of paper with ink. When ink cartridge 1 is mounted to the inkjet printer, ink cartridge 1 may be configured to supply ink to the inkjet printer.

Ink cartridge 1 may have a substantially rectangular parallelepiped shape, and may comprise a main body (not shown) configured to store ink therein. Ink cartridge 1 may comprise a case 2, which may enclose substantially the entirety of the main body, and may have a substantially rectangular parallelepiped shape, including a five walls. One opening may be formed by the edges of four of the five walls, and case 2 further may comprise a lid 3 connected to, e.g., adhered to, the four of the five walls of case 2, via an adhesion method, e.g., a thermal adhesion method, to cover the opening of case 2.

Case 2 further may comprise a side outer face 2a, and an ink supply portion 5 positioned at side outer face 2a, and configured to supply ink within the main body of ink cartridge 1 to the outside of the ink cartridge. Moreover, case 2 may comprise a synthetic resin, e.g., nylon, polyethylene, polypropylene, any combination thereof, and the like. Case 2 also may be injection-molded. Side outer face 2a may have a circular identifying imprint 4 formed thereon. Identifying imprint 4 may be substantially flush with side outer face 2a. Identifying imprint 4 may comprise minute depressions and elevations.

Figure 2A:
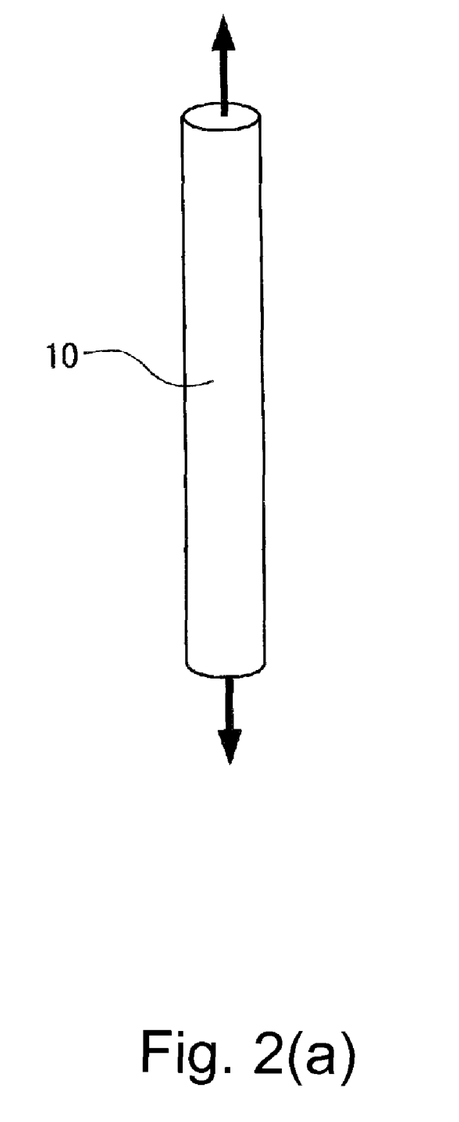
FIGS. 2(A) and 2(B) are perspective views illustrating a dividing, e.g., a fracturing, step according to an embodiment of the invention.
Figure 2B:
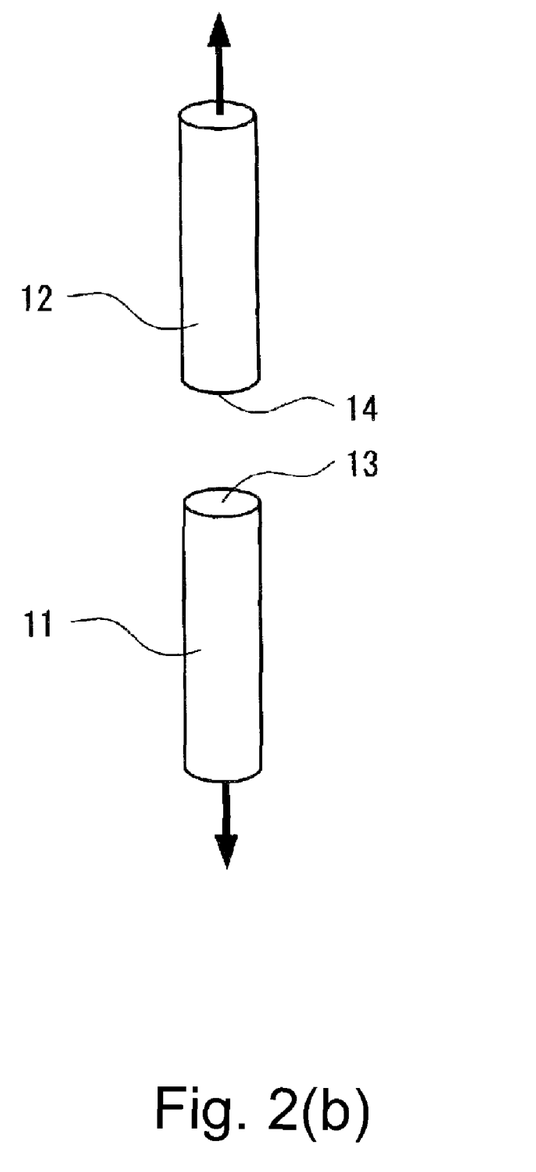
Figure 3:
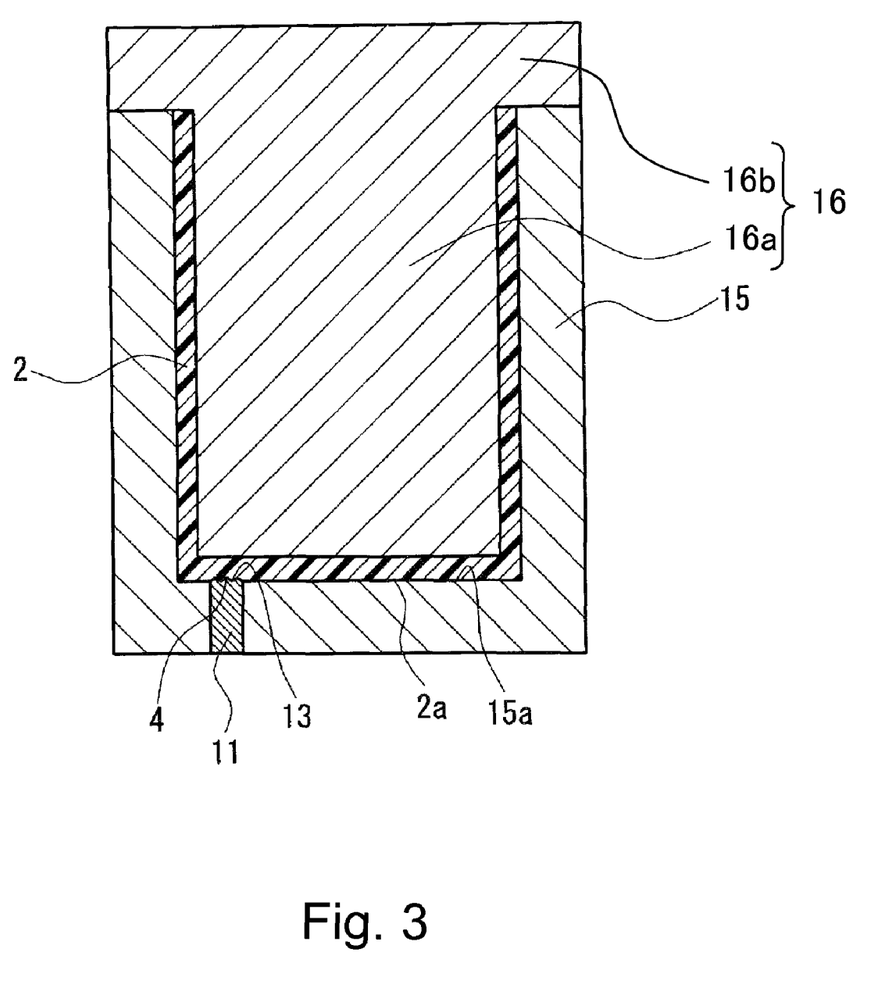
FIG. 3 is a cross-sectional view illustrating a molding step and a transferring step according to an embodiment of the invention.

FIGS. 2(a), 2(b), and 3, describe a manufacturing method for a resin-molded product, e.g., ink cartridge 1, including the method of forming identifying imprint 4, according to an embodiment of the invention. Referring to FIGS. 2(a) and 2(b), a particular material, e.g., a base material 10 may be prepared. Base material 10 may have a substantially cylindrical shape having an axial direction and a radial direction which is perpendicular to the axial direction. A force, e.g., a tensile force, may be applied to base material 10, which may stretch base material 10 along the axial direction of base material 10. This force may divide, e.g., fracture base material 10 into a first portion, e.g., fractured portion 11, and a second portion, e.g., fractured portion 12. Alternatively, a force may be applied to ends of base material 10 in opposite directions which are perpendicular to the axial direction of base material 10. Fractured portions 11, 12 may comprise identifying surfaces, e.g., fractured surfaces 13, 14, respectively. Each of fractured surfaces 13, 14 may have an irregular pattern of minute depressions and elevations. Because base materials 10 may not divide, e.g., fracture, in the same manner, depending on a plurality of factors, e.g., the force applied, and the composition of the base materials, the irregular pattern of minute depressions and elevations may differ from one pair of fractured surfaces 13, 14 to another pair of fractured surfaces 13, 14. Therefore it may be difficult to reproduce the same irregular pattern of minute depressions and elevations when different base materials 10 are divided, e.g., fractured.

Base material 10 may comprise a brittle material, e.g., a ceramic material or a combination of ceramic materials, a cemented carbide, and the like. Alternatively, base material 10 may comprise a metal material which may have a high brittleness at low temperature, e.g., a carbon steel, a ferritic stainless steel, e.g., Japanese Industrial Standard SUS430, and the like. Such a base material 10 may be divided, e.g., fractured, at low temperature. When this brittle base material 10 is divided, e.g., fractured, fractured surfaces 13, 14 may have an irregular pattern of depressions and elevations. These depressions and elevations may be minute, e.g., on the order of micrometers. Moreover, base material 10 may be divided, e.g., fractured, without deforming plastically. Therefore, the pattern of fractured surface 13 may correspond to the pattern of fractured surface 14 almost completely. More specifically, one of fractured surfaces 13, 14 may have a reversed pattern, e.g., a negative, of the other of fractured surfaces 13, 14.

FIG. 3 shows an outer die 15 and an inner die 16 according to an embodiment of the invention. Outer die 15 may have a substantially rectangular parallelepiped shape, including a five walls and one opening formed by the edges of four of the five walls. Inner die 16 may comprise a base 16a and a substantially rectangular parallelepiped column 16b, which may extend from base 16a. Column 16b may be configured to be positioned within outer die 15. Outer die 15 may comprise an inner surface 15a opposite the opening, and inner surface 15a may be configured to mold side outer face 2a of case 2. Either of fractured portions 11, 12 may be buried in outer die 15, in such a manner that fractured surface 13 or 14 may be exposed to the interior of outer die 15. Fractured surface 13 or 14 may be substantially flush with inner surface 15a. Specifically, fractured surface 13 or 14 may be exposed to a space, e.g., a passage, defined by outer die 15 and inner die 16, which may be filled with resin material, such that fractured surface 13 or 14 contacts resin material when the space, e.g., the passage is filled with resin material.

Resin material may be molded into case 2 with outer die 15 and inner die 16. Specifically, case 2 may be injection-molded by injecting the resin material to the space, e.g., the passage in the interior of outer die 15 and between outer die 15 and inner die 16, such that the space is filled with resin material. The pattern of fractured surface 13 or 14 may be transferred to side outer face 2a of case 2 while case 2 is molded. As such, identifying imprint 4, which may have a pattern corresponding to the pattern of fractured surface 13 or 14, may be formed on side outer face 2a of case 2, thereby forming identifying imprint 4 on ink cartridge 1.

The pattern of minute depressions and elevations of fractured surface 13, 14 may be irregular, which may result in an irregular pattern of minute depressions and elevations on identifying imprint 4. Therefore, it may be difficult to copy the pattern of identifying imprint 4 using a machining process. Moreover, if a die is made from identifying imprint 4, and identifying imprint 4 is copied by using the die, copied identifying imprint 4 may have depressions and elevations having corners which may be more rounded than the corners of depressions and elevations of genuine identifying imprint 4. Therefore, it may be difficult to reproduce an identical identifying imprint 4.

Before fractured portion 11 or 12 is buried in outer die 15, an image of the pattern of depressions and elevations of fractured surface 13 or 14 may be obtained, for the purpose of comparing the image to identifying imprint 4. Specifically, predetermined areas of the pattern of fractured surface 13 or 14 may be selected, and images of these predetermined areas may be obtained. To determine whether ink cartridge 1 is genuine, identifying imprint 4 of ink cartridge 1 may be observed with a microscope, e.g., an electron microscope, and predetermined areas of the pattern of identifying imprint 4 may be compared to the images. When comparing the pattern of identifying imprint 4 to the images, it may be taken into account that the pattern of identifying imprint 4 is reversed when compared to the pattern of fractured surface 13 or 14. If the patterns of identifying imprint 4 in the predetermined areas match the patterns in the images, it may be determined that ink cartridge 1 is genuine. If the patters do not match, it may be determined that ink cartridge is not genuine.

In another embodiment, the pattern of identifying imprint 4 transferred from one of fractured surfaces 13, 14 may be compared to the pattern of the other of fractured surfaces 13, 14. In this case, the patterns compared may not be reversed. Therefore, it may be easier to determine whether ink cartridge 1 is genuine, and the determination may be more precise.

Figure 4:
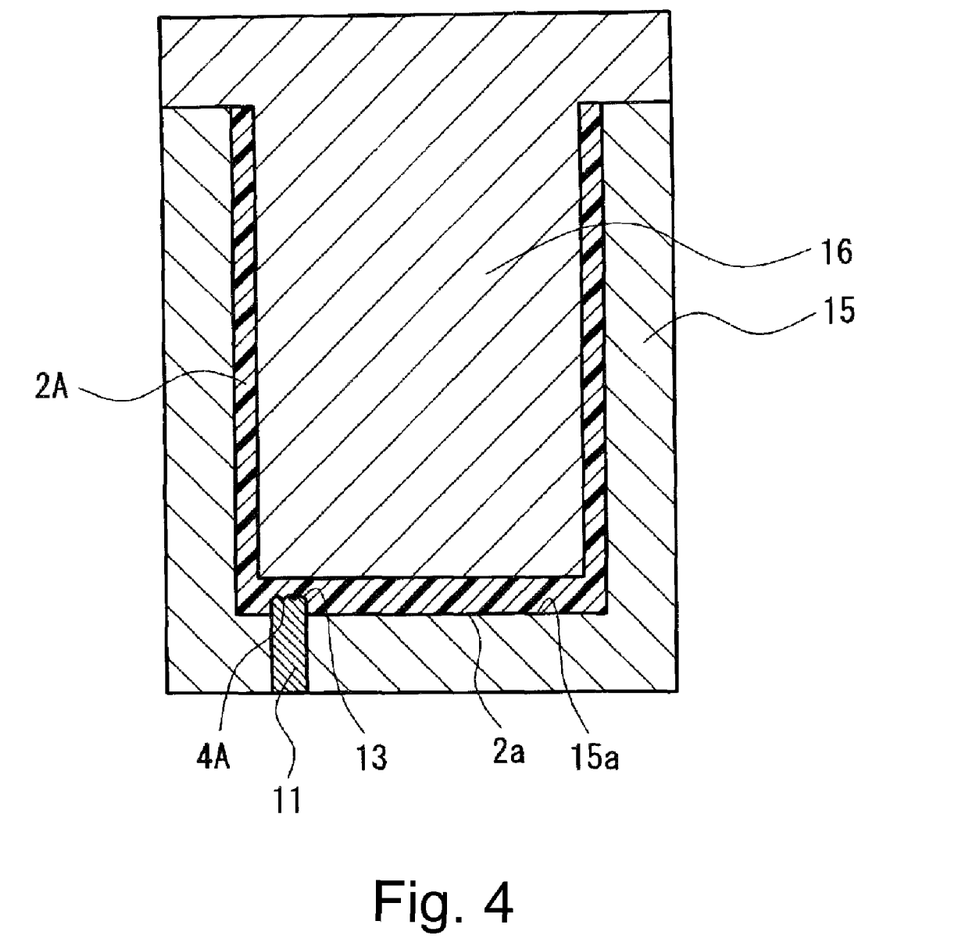
FIG. 4 is a cross-sectional view illustrating a molding step and a transferring step according to another embodiment of the invention.

FIG. 4 shows a method of forming identifying imprint 4 according to another embodiment of the invention. A portion of fractured portion 11 or 12 may extend into the interior of outer die 15 from inner surface 15a, such that fractured surface 13 or 14 may be positioned further inside, e.g., toward the interior, of outer die 15 than inner surface 15a. By manufacturing ink cartridge 1 with the outer die 15 according to this embodiment, identifying imprint 4 may be recessed from side outer face 2a of case 2. Therefore, during manufacture or shipping of ink cartridge 1, identifying imprint 4 may be prevented from contacting other objects, which may prevent scarring or wearing down of the pattern of minute depressions and elevations of identifying imprint 4. This may decrease the risk that genuine ink cartridge 1 falsely may be determined as not genuine.

Figure 5A:
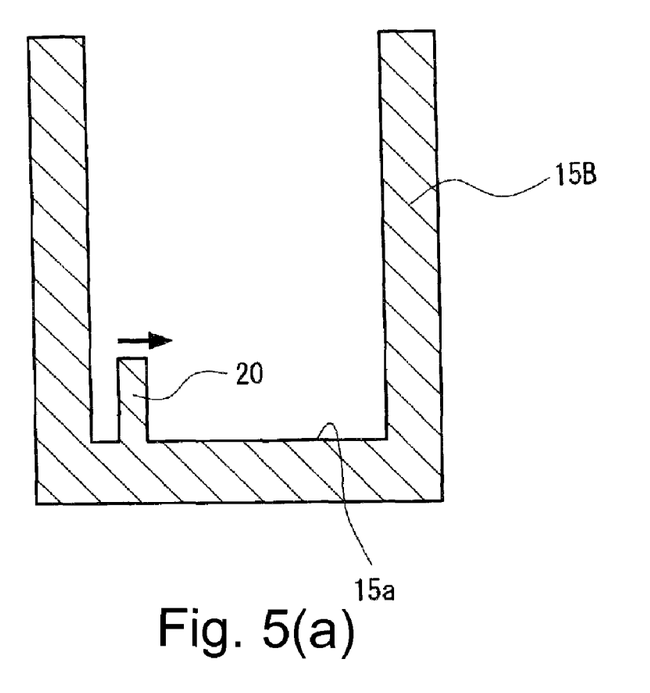
FIGS. 5(a) and 5(b) are cross-sectional views illustrating a dividing, e.g., a fracturing, step according to yet another embodiment of the invention.
Figure 5B:
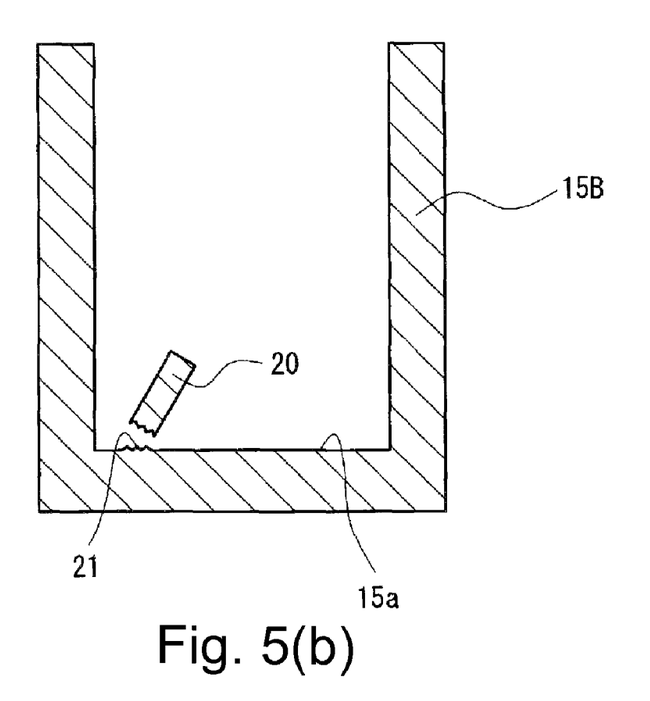

FIGS. 5(a) and 5(b) show a method of forming identifying imprint 4 according to yet another embodiment of the invention. In this embodiment, an outer die 15B may comprise an integral extending portion 20, which may extend from inner surface 15a into the interior of outer die 15, in an extending direction. A force may be applied to extending portion 20 in a direction perpendicular to the extending direction, such that extending portion 20 may be divided, e.g., fractured from outer die 15B. As such, an identifying surface, e.g., fractured surface 21, may be formed on inner surface 15a. In this embodiment, it is not required that a fractured portion be buried in outer die 15B. This may simplify the manufacturing process of ink cartridge 1.

Figure 6:
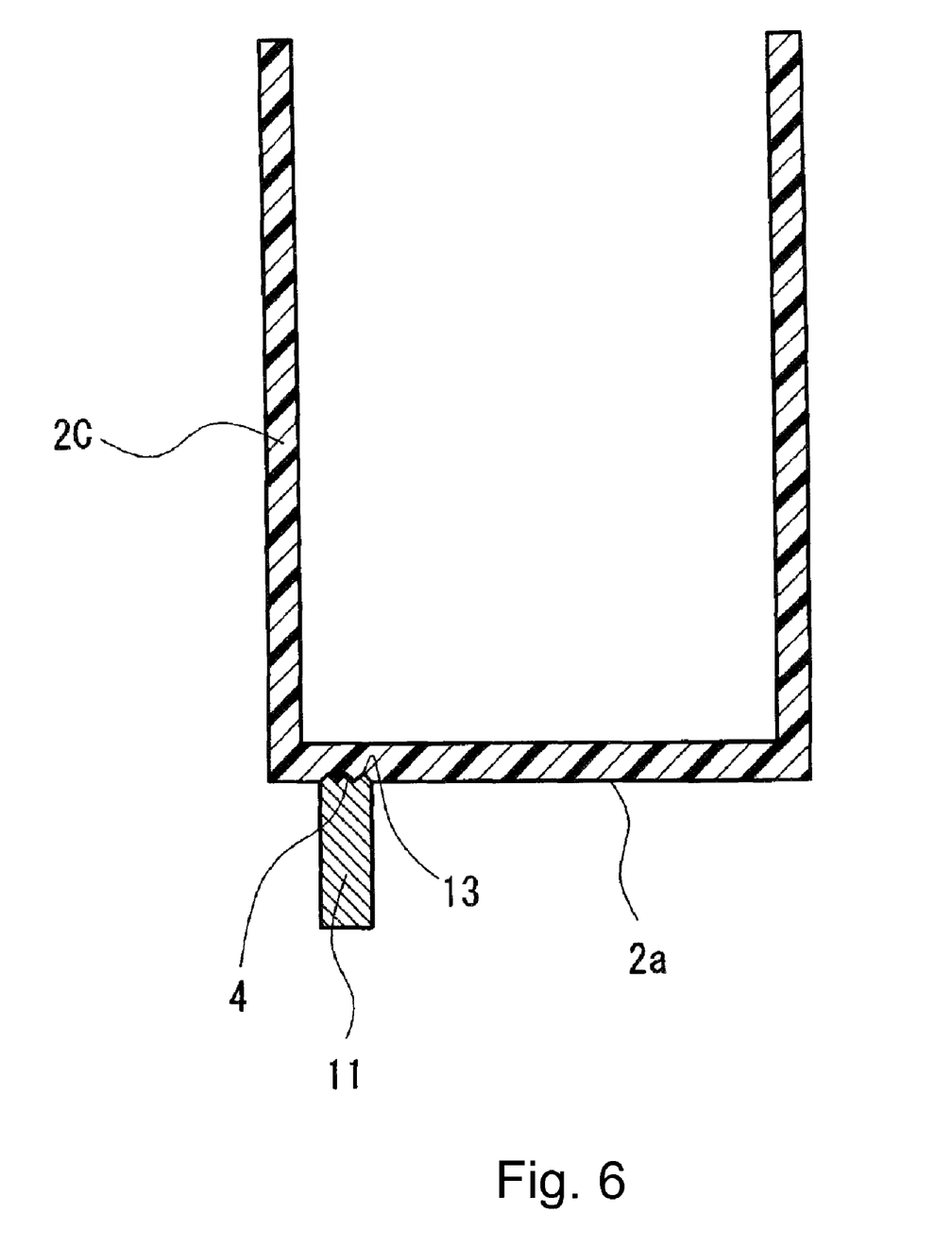
FIG. 6 is a cross-sectional view illustrating a transferring step according to still another embodiment of the invention.

FIG. 6, shows a method of forming identifying imprint 4 according to still another embodiment of the invention. In this embodiment, case 2C may be molded with an outer mold (not shown) having no fractured surfaces, and inner die 16. After case 2C is molded, an identifying surface, e.g., fractured surface 13 or 14 of fractured portion 11 or 12 may be brought into contact with side outer face 2a of case 2C, while case 2C is heated. This may transfer the pattern of fractured surface 13 or 14 to outer face 2a. In this embodiment, if an outer mold having no fractured surfaces is available to the manufacturer of ink cartridge 1, ink cartridge 1 may be manufactured using an existing outer mold. Therefore, there may be no need to manufacture a new outer mold, which may reduce production costs.

FIGS. 7(a)-8(b) show a method of forming an identifying imprint 4D according to still a further embodiment of the invention. Identifying imprint 4D may comprise minute depressions and elevations 32 and a protrusion 33 having a predetermined shape. In this embodiment, protrusion 33 may have a sector shape, e.g., a portion of a pie shape. Protrusion 33 may form a corner 34 with side outer face 2a, and minute depressions and elevations 32 may extend to a position adjacent to corner 34.

Figure 8A:
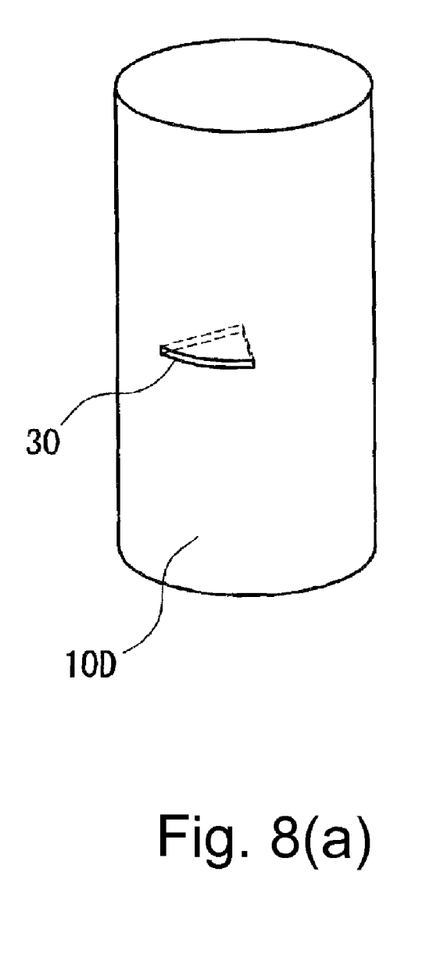
FIGS. 8(a) and 8(b) are perspective views illustrating a dividing, e.g., a fracturing, step according to still yet another embodiment of the invention.
Figure 8B:
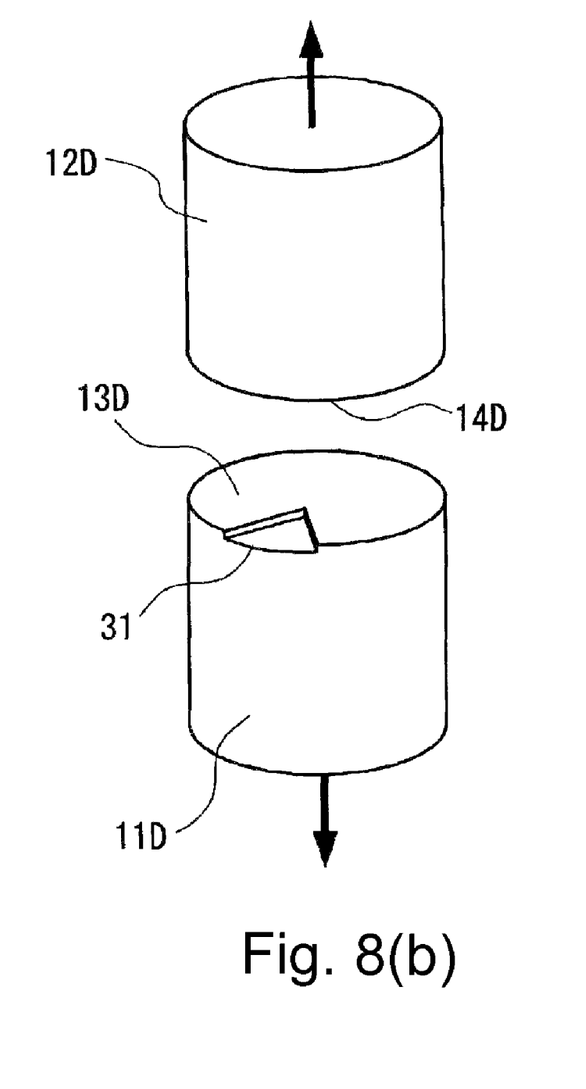

In this embodiment, a portion of a periphery of a particular material, e.g., a base material 10D may be removed, e.g., cut out with an electric discharge machine, such that a recessed portion 30 may be formed in a regular shape, e.g., a sector shape. Base material 10D may have a substantially cylindrical shape having an axial direction and a radial direction which is perpendicular to the axial direction. Recessed portion 30 is formed in base material 10D in the radial direction. A force, e.g., a tensile force, may be applied to base material 10D, which may stretch base material 10D along the axial direction of base material 10D. This may divide, e.g., fracture base material 10D into a fractured portion 11D and a fractured portion 12D. Alternatively, a force may be applied to ends of base material 10D in opposite directions perpendicular to the axial direction of base material 10D. Because recessed portion 30 is formed in base material 10D, stress may be concentrated on recessed portion 30 when the tensile force is applied to base material. Therefore, base material 10D may be divided, e.g., fractured, with recessed portion 30 at a starting point of the dividing, e.g., fracturing. Fractured portions 11D, 12D may comprise identifying surfaces, e.g., fractured surfaces 13D, 14D, respectively.

Among two fractured surfaces 13D, 14D, fractured surface 13D may comprise an irregular pattern of minute depressions and elevations, and a recess 31, which may have a regular shape, e.g., a sector shape. Recess 31 may be a portion of recessed portion 30. Recess 31 may form a corner with an unrecessed portion of fractured surface 13D, and the minute depressions and elevations, which may be formed by the dividing, e.g., fracturing, may extend to a position adjacent to the corner. Identifying imprint 4D may comprise a protrusion 33 corresponding to recess 31 of fractured surface 13D, and minute depressions and elevations 32 corresponding to the minute depressions and elevations of fractured surface 13D. Because minute depressions and elevations 32 may extend to a position adjacent to corner 34, it may be difficult to create a die from identifying imprint 4D, because it may be difficult for the material of the die to flow into corner 34 of identifying imprint 4D. Therefore, a die created in this manner easily may be chipped or deformed. Moreover, when the die is removed from identifying imprint 4, the die may flake apart at corner 34 of identifying imprint 4D. Therefore, it may be difficult to reproduce an identical identifying imprint 4D.

Figure 7A:
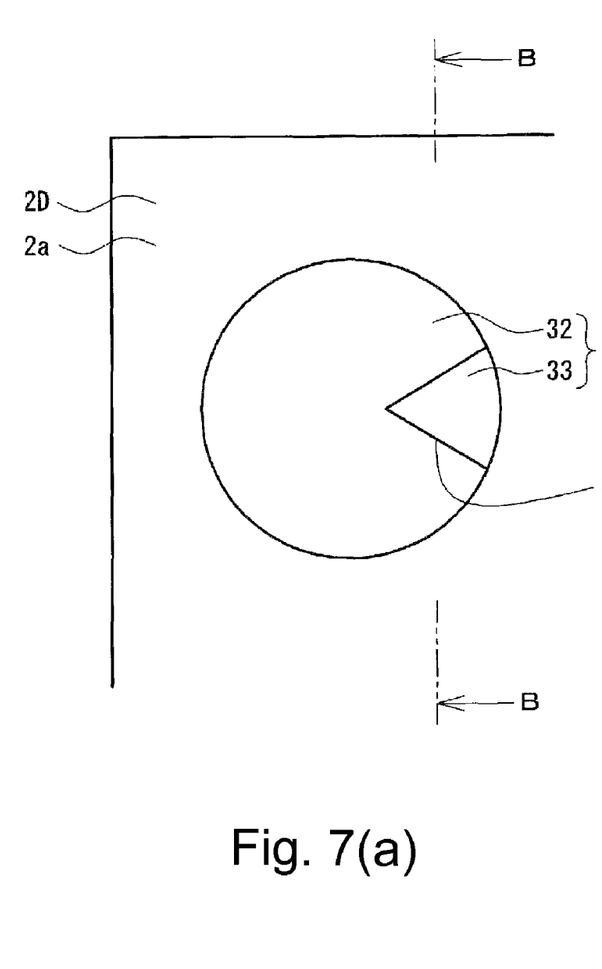
FIG. 7(a) is a partial expanded view of an ink cartridge according to still yet another embodiment of the invention.

In this embodiment, when observing identifying imprint 4D, a tip of sector-shaped protrusion 33, for example, may be used as a reference point to identify the predetermined areas of the pattern of minute depressions and elevations 32. This may allow identifying imprint 4D to be observed more easily and more quickly.

The shape of recessed portion 30 may not limited to the sector shape, e.g., portion of a pie shape. Moreover, if fractured surface 14D of fractured portion 12D may comprise a recess which is a portion of recessed portion 30, fractured portion 12D may be used to form identifying imprint 4D.

FIGS. 9-11(c) show a method of forming an identifying imprint 4E according to yet a further embodiment of the invention. In this embodiment, identifying imprint 4E may comprise minute depressions and elevations 43 and a protrusion 44 having a predetermined shape, e.g., a shape of a character, or a design such as a symbol, e.g., a character of "A", and the like. Protrusion 44 may form a corner with side outer face 2a, and minute depressions and elevations 43 may extend to a position adjacent to corner 34.

Figure 10:
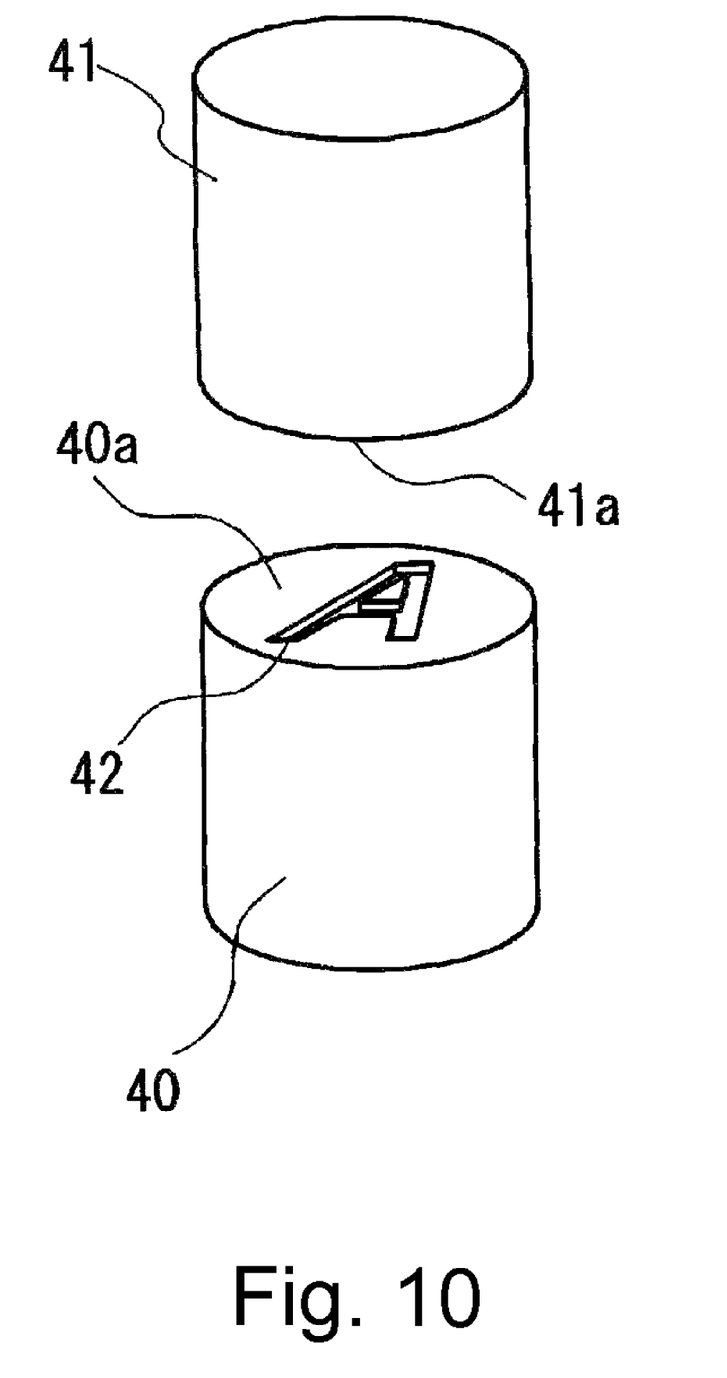
FIG. 10 is a perspective view of base material portions according to a further embodiment of the invention.
Figure 11A:
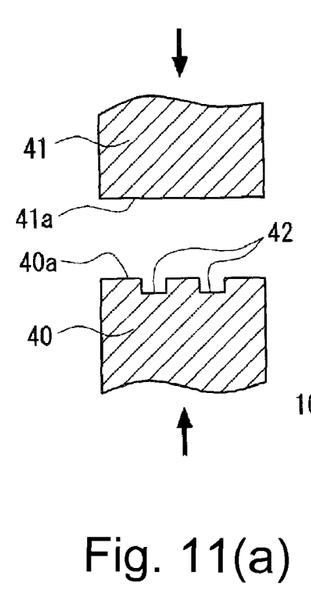
FIGS. 11(a) to 11(c) are perspective views illustrating a joining, e.g., connecting, step and a dividing, e.g., a fracturing, step according to a further embodiment of the invention.
Figure 11B:
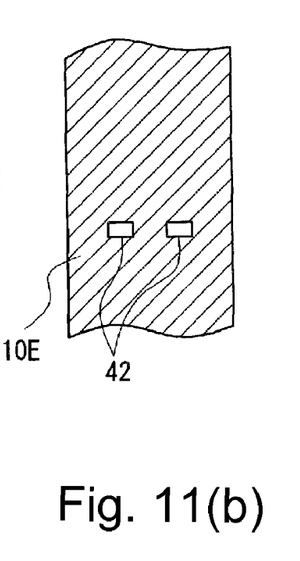

Referring to FIG. 10, in this embodiment, a first portion and a second portion, e.g., two cylindrical base material portions 40, 41 may be prepared. Base material portions 40, 41 may comprise a metal. A recess 42 having a shape, e.g., a shape of a character "A", may be formed in an end surface 40a of base material portion 40. Recess 42 may be large enough to be visible, or distinguishable, to the unaided human eye. Referring to FIGS. 11(a) and 11(b), end surface 40a of base material portion 40 and an end surface 41a of base material portion 41 may be joined, e.g., bonded via metal diffusion bonding, such that base material portion 40 and base material portion 41 may be joined, e.g., bonded, into base material 10E. Base material 10E may have a substantially cylindrical shape having an axial direction and a radial direction perpendicular to the axial direction. Subsequently, referring to FIG. 11(c), a tensile force may be applied to base material 10E, which may stretch base material 10E along the axial direction of base material 10E. This force may cause base material 10E to divide, e.g., fracture, into a modified first portion and modified second portion, e.g., fractured portion 11E and a fractured portion 12E.

Figure 11C:
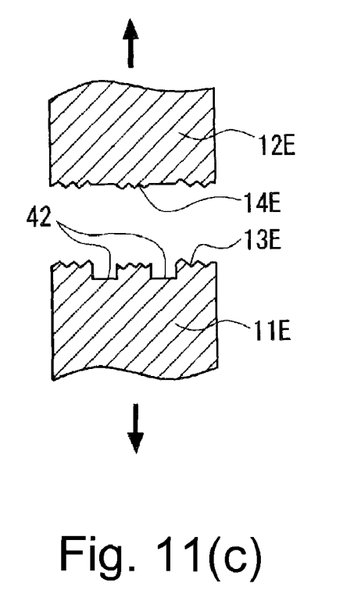

Alternatively, a force may be applied to ends of base material 10E in opposite directions which may be perpendicular to the axial direction of base material 10E. The joining, e.g., the metal diffusion bonding, may be a method of bonding two metal materials, in which the two materials may be pressed against each other at a high temperature, such that metal atoms may diffuse from one material into another via the bonded surface.

Because base material portions 40, 41 are joined, e.g., bonded, via metal diffusion bonding, crystal grains may grow beyond the bonded surface, and therefore the bonded surface may disappear almost completely. Therefore, when a tensile force is applied to base material 10E, base material 10E may not be divided, e.g., fractured at the bonded surface of base material portions 40, 41. Within base material 10E, a space may be formed by recess 42 of base material portion 40 and end surface 41a of base material portion. Therefore, when a tensile force is applied to base material 10E, stress, e.g., a force, may be applied to, e.g., concentrated on recess 42, and base material 10E may be divided, e.g., fractured with recess 42 being a staring point of the fracturing. Fractured portion 11E, 12E may comprise identifying surfaces, e.g., fractured surfaces 13E, 14E, respectively. Among fractured surfaces 13E, 14E, fractured surface 13E may comprise recess 42 and an irregular pattern of minute depressions and elevations.

Figure 9:
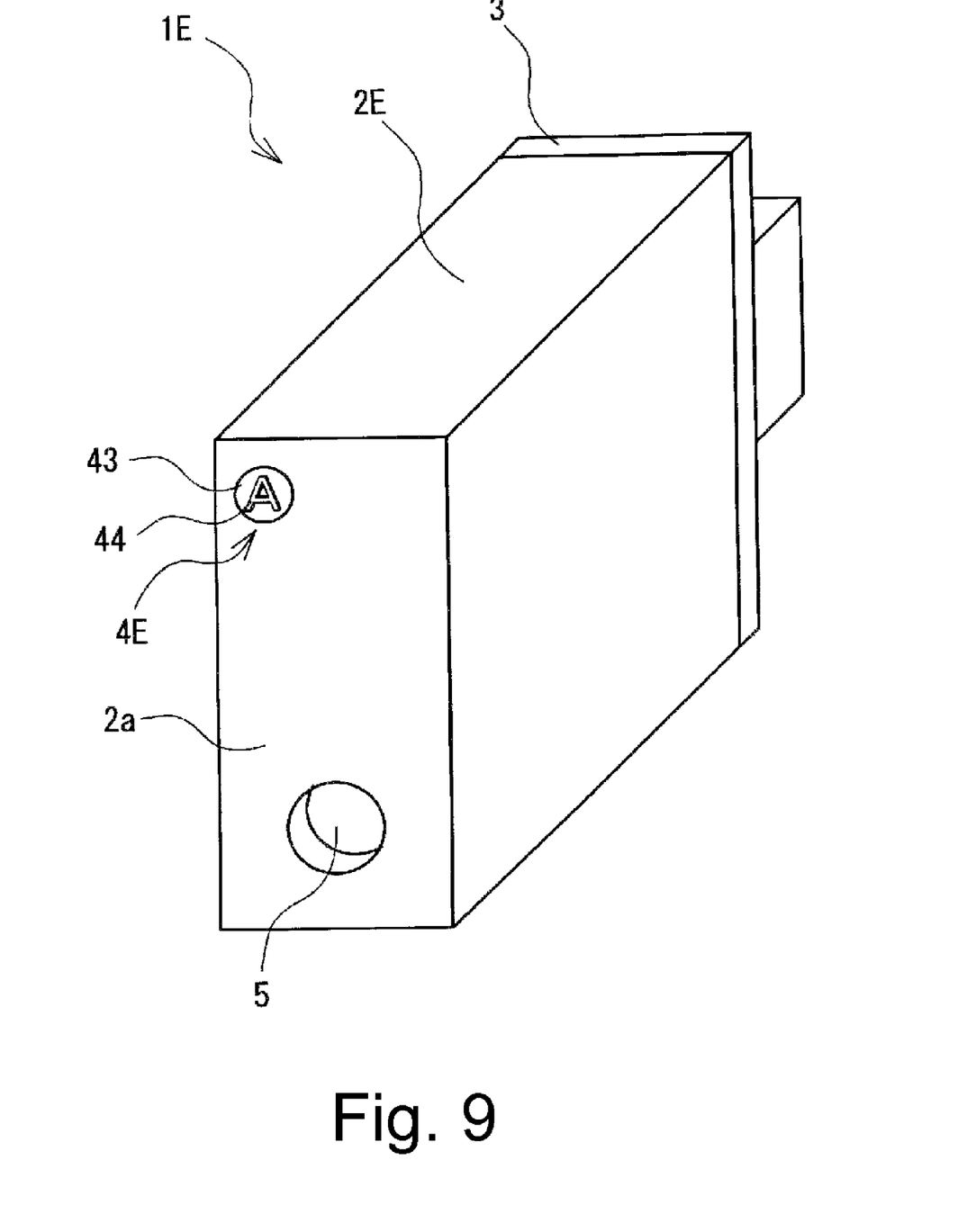
FIG. 9 is a perspective view of an ink cartridge according to a further embodiment of the invention.

By transferring fractured surface 13E to side outer face 2a of case 2E, identifying imprint 4E may be formed. Identifying imprint 4E may comprise a protrusion having a shape, e.g., a shape of a character "A", the size of which may be large enough to be visible, or distinguishable, to the unaided human eye. Identifying imprint 4E may improve ornamental appearance of an ink cartridge 1E. The shape of recess 42 may be a character indicating a corporate name, a product name, a model number, a color of ink, and the like. Identifying imprint 4E also may be a logo or a symbol indicating a corporate name, a product name, and the like. As such, identifying imprint 4E may comprise minute depressions and elevations indicating whether ink cartridge 1E is genuine, and a protrusion 44 indicating a corporate name, a product name, and the like.

Because identifying imprint 4E may comprise protrusion 44 and minute depressions and elevations 43, and minute depressions and elevations 43 may extend to a position adjacent to the corner of protrusion 44, it may be difficult to reproduce identifying imprint 4E by making a die from identifying imprint 4E. Therefore, the observation of identifying imprint 4E may be performed more easily and more quickly.

Although base material 10E may be divided, e.g., fractured at the boundary of recess 42 and end surface 41a, base material 10E may be divided, e.g., fractured at the bottom of recess 42. In such a case, fractured surface 14E of fractured portion 12E may comprise end surface 41a and a recess comprising side walls of recess 42. Identifying imprint 4E may be formed by using this fractured portion 12E.

The method of joining, e.g., connecting, base material portions 40, 41 may not limited to metal diffusion bonding. Another method may be used to join, e.g., connect, base material portions 40, 41 as long as base material 10E is not divided, e.g., fractured, at the connected surface of base material portions 40, 41 when a tensile force is applied to base material 10E. Base material portions 40, 41 may not limited to a metal. Base material portions 40, 41 may comprise a brittle material, e.g., a ceramic or combination of ceramics, a cemented carbide, and the like.

Various methods according to various embodiments have been described above. Nevertheless, these various methods may be combined in various combinations in other embodiments of the invention. For example, the method shown in FIG. 4, and the method shown in FIGS. 9-11(c) may be combined. In such an embodiment, an identifying imprint may be recessed from a side outer face of a case of an ink cartridge, and the identifying imprint may comprise minute depressions and elevations, and a protrusion having a shape of a character. Because the protrusion of the identifying imprint may not extend beyond the side outer face, during manufacture or shipping of the ink cartridge, the identifying imprint may be prevented from contacting other objects, which may prevent damage to the identifying imprint.

Figure 7B:
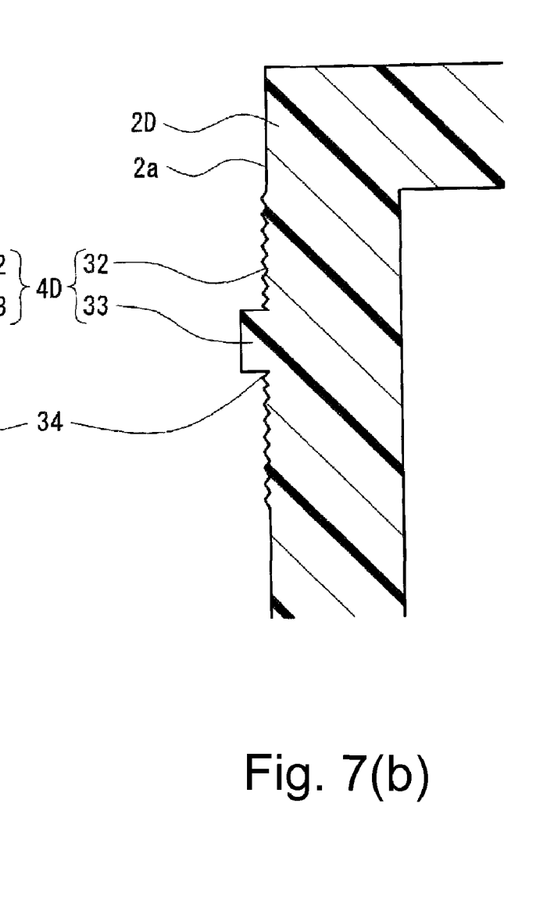
FIG. 7(b) is cross-sectional view taken along line B-B of FIG. 7(a).

In still another embodiment of the invention, the method shown in FIGS. 5(a)-5(b) and the method shown in FIGS. 7(a)-8 may be combined. In such a case, a recessed portion may be formed in an extending portion, which may extend from an inner surface of an outer die, and a force may be applied to the extending portion such that the extending portion is divided, e.g., fractured with the recessed portion being a staring point of the dividing, e.g., fracturing.

The above-described various methods may not be limited to ink cartridges, buy may be applied to resin-molded products other than ink cartridges. Moreover, the molding may not be limited to an injection molding. Other molding methods that may be used with a die also may be used.

While the invention has been described in connection with exemplary embodiments, it will be understood by those skilled in the art that other variations and modifications of the exemplary embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being indicated by the following claims.

The invention claimed is:

1. A method of forming an identifying imprint on a resin-molded product, comprising the steps of: fracturing a particular material into a first portion of the particular material and a second portion of the particular material, by applying a force such that the first portion and the second portion separate from each other, to form an identifying surface on at least one of the first portion and the second portion of the particular material; molding a resin material into the resin-molded product; and transferring an imprint of the identifying surface of the particular material onto the resin-molded product.

2. The method of claim 1, wherein the step of molding comprises the substep of molding using a die, and the step of molding and the step of transferring are performed substantially simultaneously, and wherein the method further comprises a step of positioning the at least one of the first portion and the second portion of the particular material in the die, such that the identifying surface contacts the resin material in the step of molding and the step of transferring.

3. The method of claim 2, wherein the step of positioning comprises the substep of positioning the at least one of the first portion and the second portion of the particular material at a position in which at least a portion of the at least one of the first portion and the second portion of the particular material extends from an inner surface of the die inward toward an interior of the die.

4. The method of claim 1, wherein the step of transferring comprises the substep of, while heating the resin-molded material, contacting the identifying surface of the at least one of the first portion and the second portion of the particular material with the resin-molded material.

5. The method of claim 1, further comprising a step of forming a recessed portion in the particular material prior to the step of fracturing.

6. The method of claim 5, wherein the particular material comprises a substantially cylindrical portion having an axial direction and a radial direction which is perpendicular to the axial direction, and the recessed portion is formed in the particular material in the radial direction.

7. The method of claim 5, wherein the step of FRACTURING comprises the substep of fracturing the particular material at the recessed portion formed in the particular material.

8. The method of claim 5, wherein the identifying surface comprises at least a portion of a surface formed by the step of forming the recessed portion.

9. The method of claim 1, wherein the particular material comprises a brittle material.

10. A method of forming an identifying imprint on a resin-molded product, comprising the steps of: forming a recessed portion in an end surface of a first portion of a particular material; joining the end surface of the first portion of the particular material to an end surface of a second portion of the particular material; fracturing the joined particular material, at a predetermined position adjacent to the recessed portion of the first portion, into a modified first portion of the particular material and a modified second portion of the particular material, by applying a force such that the modified first portion and the modified second portion separate from each other, to form an identifying surface on at least one of the modified first portion and the modified second portion of the particular material; molding a resin material into the resin-molded product; and transferring an imprint of the identifying surface of at least one of the modified first portion and the modified second portion of the particular material onto the resin-molded product.

11. The method of claim 10, further comprising the step of applying a force to the position at which the recessed portion was formed in the first portion of the particular material during the step of dividing the particular material.

12. The method of claim 10, wherein the recessed portion has a predetermined shape.

13. The method of claim 12, wherein the predetermined shape is an identifying character or an identifying design.

14. The method of claim 10, wherein the particular material comprises a metal, and the joining step comprises a substep of bonding the end surface of the first portion of the particular material to the end surface of the second portion of the particular material via metal diffusion bonding.

15. The method of claim 10, wherein the identifying surface of at least one of the modified first portion and the modified second portion of the particular material comprises at least a portion of the recessed portion.

16. A method of forming an identifying imprint on a resin-molded product, the method comprising the steps of: applying a force to an extending portion of an inner surface of a die; fracturing the extending portion from the inner surface of the die via the applied force to form an identifying surface on at least a portion of the inner surface of the die; molding a resin material into the resin-molded product with the inner surface of the die; and transferring an imprint of the identifying surface of the inner surface of the die onto the resin-molded product.

* * * * *